Oct. 8, 1940.  J. R. F. TERRELL  2,217,573
CONTROLLING ELECTRIC CIRCUITS
Filed Nov. 8, 1937  2 Sheets-Sheet 1

INVENTOR
J. R. F. TERRELL
By Young, Emery & Thompson
ATTYS.

Oct. 8, 1940.  J. R. F. TERRELL  2,217,573

CONTROLLING ELECTRIC CIRCUITS

Filed Nov. 8, 1937  2 Sheets-Sheet 2

INVENTOR
J.R.F. TERRELL
BY Young, Emery & Thompson
ATTYS.

Patented Oct. 8, 1940

2,217,573

UNITED STATES PATENT OFFICE 2,217,573

CONTROLLING ELECTRIC CIRCUITS

John Robert Francis Terrell, South Yarra, Victoria, Australia

Application November 8, 1937, Serial No. 173,464
In Australia November 19, 1936

2 Claims. (Cl. 200—32)

This invention relates to the control and regulation of electric currents, and refers especially to means for controlling the amount of electric energy liberated in an electric circuit in a given time, and the manner in which such energy is liberated.

It is known to provide means for regulating the liberation of electric energy in a circuit, whereby the circuit is energized and de-energized intermittently for variable periods of time.

It is an object of this invention to provide improved means of this type.

According to this invention I provide apparatus for controlling the current flowing in an electric circuit comprising a tiltable mercury switch interposed in the circuit, a carriage on which the mercury switch is mounted, a hollow cylindrical cam cut away obliquely towards one end, means for rotating the cam, a follower connected to the mercury switch, one end of said follower being arranged to move over the surface of the cam as it rotates in order to alternately tilt the mercury switch to its closed and open positions, guides disposed parallel to the axis of the cam and on which the carriage is mounted to permit its being moved longitudinally of said cam, means for moving the carriage in either direction along the said guides whereby the ratio of the period of closure to the period of non-closure of the switch may be varied, and means for stopping rotation of the cam when the position of the switch relative to the cam is such that said switch is maintained either continuously closed or continuously open.

This invention is applicable to the regulation of electric energy in an electric circuit or circuits, whether such energy is utilized in the form of heat, light or motive power.

Having described the object and nature of my invention, reference will now be made to the accompanying drawings, wherein.

Figure 1:
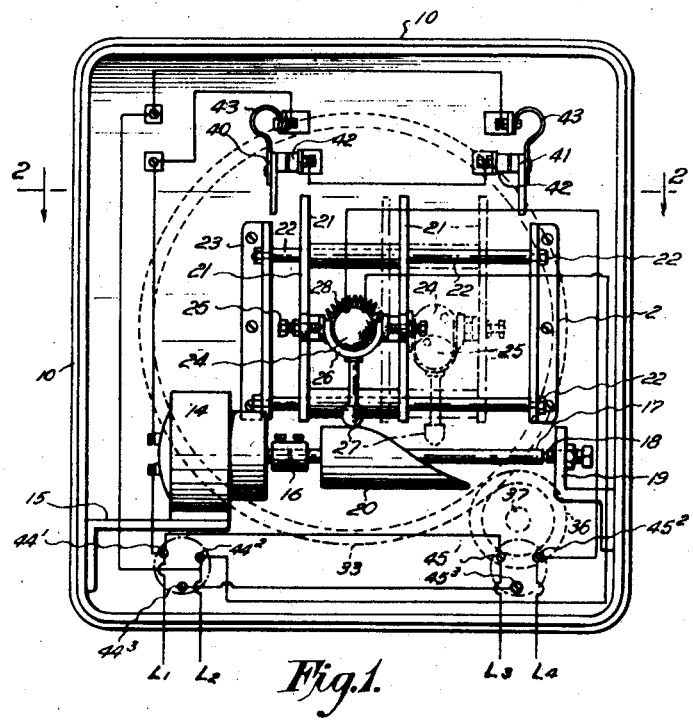
Figure 1 is a view in rear elevation of a device constructed in accordance with my invention.
Figure 2:
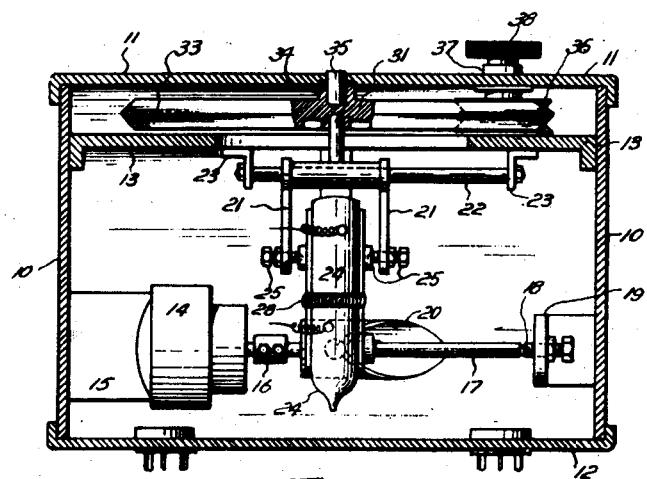
Figure 2 is a view in sectional plan taken on the line 2—2 of Figure 1.
Figures 3, 4:
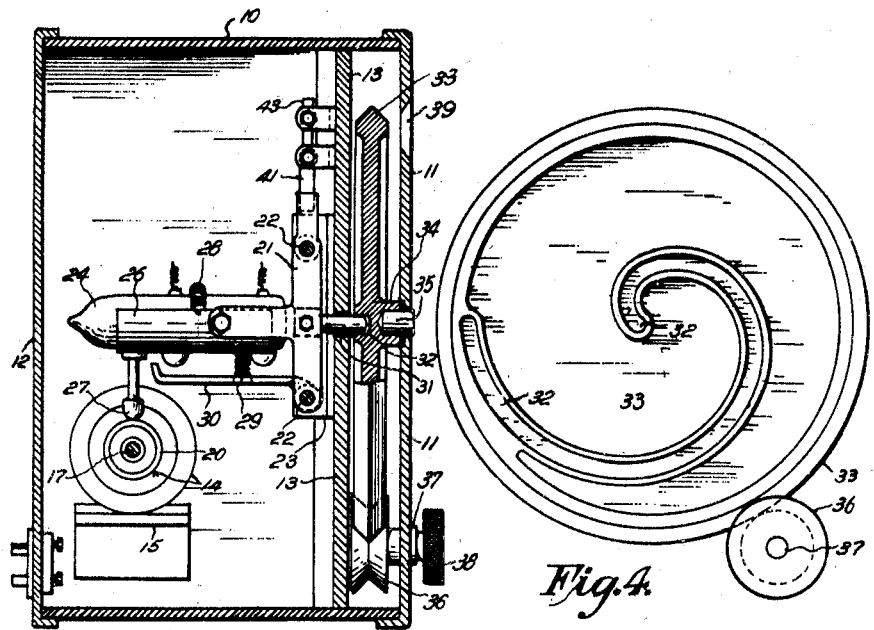
Figure 3 is a view in sectional side elevation of the device shown in Figure 1.
Figure 4 is a view in rear elevation of the disc for operating the carriage.

Referring to the drawings, wherein the same reference characters are used to indicate like or corresponding parts, and with particular reference to Figures 1 to 4, the reference numeral 10 indicates the frame or wall of the cabinet or box in which the device is mounted, and this frame may be constructed of wood, metal or other suitable material and is preferably moulded from synthetic resin. The cabinet is provided with a front wall 11 and a rear wall 12 detachably secured to the frame 10, and an intermediate wall 13 near the front of the cabinet is also provided, this wall being also secured to the frame 10.

An electric motor 14 is mounted on a bracket 15 secured to the frame 10 and the spindle of this motor is connected by a coupling 16 to one end of a shaft 17 the other end of which is supported by an adjustable pin bearing consisting of a screw 18 passing through a bracket 19 attached to the opposite wall of the frame. A cylindrical cam 20 is mounted on and secured to the shaft 17 and this cam is cut away diagonally towards one end for the purpose hereinafter explained. Although the cam 20 is illustrated as being formed of a metal tube it may if desired be solid.

A carriage 21 is slidably mounted on horizontal guide rods 22 supported in brackets 23 fastened to the intermediate wall 13 and a U-shaped cradle is pivotally supported on the carriage by means of pin bearings 25. A follower 27 having a rounded lower end depends from one end of the cradle in such a position as to contact with the surface of the cam 20. A mercury switch 24 is held in the tiltable cradle 26 by a coil spring 28 and a compression spring 29 is arranged between a bracket 30 secured to the carriage 21 and the end of the cradle 26 remote from the follower 27. The spring 29 thus tends to keep the follower 27 in contact with the cam 20.

The carriage 21 is provided with a pin 31 which extends through a horizontal slot in the intermediate wall 13 and into a spiral slot 32 formed on the rear surface of a disc 33 rotatably mounted in the compartment between the front wall 11 and the intermediate wall 13. This disc 33 is provided with an outstanding boss 34 which is bored to receive a short spindle 35 secured to the front wall 11, thus enabling rotation of the disc 33. The edge of the disc 33 is tapered so as to frictionally engage a small wheel or pulley 36 mounted on a shaft 37 which extends through the front wall 11, and may be rotated by a knurled knob 38. Rotation of this knob 38 causes the disc 33 to revolve and thus causes movement of the carriage 21 along the rods 22 at the same time moving the follower 27 along the cam 20.

An opening 39 in the front wall 11 is provided to permit inspection of the edge of the disc 33 whereby the operator may ascertain the position of the follower 27 on the cam 20. If desired suitable graduation marks may be provided on the disc 33.

Means are provided to cut out the motor 14 when the carriage 21 reaches the extremity of its travel in either direction, that is, when the follower 27 is either continuously on or continuously off the cam 20. This means comprises members 40 and 41, and respective coacting terminals 42.

The sides of the carriage 21 are extended upwards so that when the carriage reaches the ends of its travel along the rods 22 the upwardly extended sides will come in contact with members 40 and 41 which are arranged to break the circuit through the motor 14. The members 40, 41 are maintained in contact with coacting terminals 42 by springs 43 when the carriage is in an intermediate position between the two members.

Referring now to Figure 1 it will be noted that two groups of terminal pins are provided on the rear wall 12 of the device, one group comprising pins $44^1$, $44^2$ and $44^3$ being adapted to be connected to a suitable source of current and the other group comprising pins $45^1$, $45^2$, $45^3$ being adapted to be connected to the electric circuit to be regulated. Terminal pins $44^3$ and $45^3$ which are electrically connected are earth contacts.

The supply leads L1 and L2 are adapted to be connected to terminal pins $44^1$ and $44^2$ by a suitable socket, and pin $44^1$ is connected to the motor and to output terminal $45^1$. The opposite terminal of the motor is connected to the contact member 40, and the contact member 41 is connected to the terminal pin $44^2$ which latter is also connected to one terminal of the mercury switch 24. The two contacts 42 which respectively coact with contacts 40 and 41 are connected together. The other terminal of the mercury switch 24 is connected to output terminal $45^2$. It will thus be seen that the mercury switch 24 is interposed in the circuit to be regulated and which is connected as by a socket and leads L3 and L4 to output terminals $45^1$ and $45^2$.

In operation the motor is started as soon as the device is connected to the source of current provided that the carriage is disposed in an intermediate position and the cam 20 is thus caused to rotate and the follower 27 is caused to move over the surface of the cam. The mercury switch is so arranged that when the cam lifts the follower the switch will be on and when the follower leaves the edge of the cam this switch is off. Thus the length of time the switch is on will depend on the position of the follower along the length of the cam, since this position will determine the length of time the follower is passing over the surface of the cam. It will be understood that the nearer the follower is to the tapered end of the cam the shorter will be the time the switch is on, and the longer the time it is off, for any complete rotation of the cam. When the carriage reaches the extremity of its travel in either direction—that is, when the follower is either entirely on or entirely off the cam—its upwardly extended sides strike the members 40, 41 and cause them to move away from the terminals 42 with which they are normally held in contact by the springs 43. Breaking of the contact between either of the members 40, 41 and its corresponding terminal 42 results in stoppage of the motor owing to interruption of the current supply thereto, and by this means economy of current, and prevention of unnecessary wear and tear on the mechanism, is effected.

It will be appreciated that the amount of energy liberated in the circuit being controlled, will depend only on the ratio of the time the mercury switch is on to the time it is off and this is not affected by variations in the speed of the motor, but only by the position of the follower along the length of the cam, which is varied by the knob 38. When an alternating current supply is available it is preferred to employ a synchronous electric motor in order that the speed of the cam may be maintained relatively constant. It will be appreciated however, that if desired a variable speed motor of any approved type may be used in order to permit of regulation of the frequency with which the circuit is energized and de-energized.

Although for convenience in illustration the terminals for the input and output conductors have all been shown mounted on the rear wall 12 of the device, it is preferred to replace the output terminals $45^1$, $45^2$ and $45^3$ by a socket fitted to the front wall of the casing and adapted to detachably receive a connecting plug associated with the circuit to be controlled.

The terminal pins $44^1$, $44^2$ and $44^3$ are, however, preferably fitted substantially as shown to the rear wall of the casing whereby they may be plugged directly into a power socket fitted to a wall or other convenient support. It should be understood that the control device may be made sufficiently small in size to be readily supported by the terminal pins $44^1$, $44^2$ and $44^3$.

Figure 5:
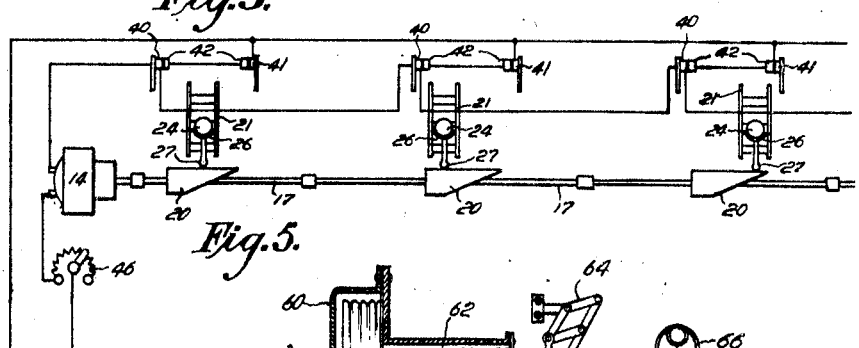
Figure 5 is a diagrammatic view showing the manner in which a number of controllers may be operated by the one motor.

In the arrangement shown in Figure 5 a number of cams 20 are rigidly connected in coaxial alignment whereby they are driven in unison by a single electric motor 14. Each of these cams operates a follower 27 which in turn operate mercury switches 24 mounted in carriages 21. In this case a variable resistance 46 is connected in the circuit of the motor in order to vary the speed thereof. This resistance 46 is connected to the source of current, through a radial contact arm and one end thereof is connected to one terminal of the motor. The opposite terminal of the motor is connected to the other supply conductor through parallel circuit elements each of which contains two pairs of contacts 40, 42 and 41, 42 respectively arranged in series. It will be appreciated that in an arrangement of this kind each carriage may be arranged in a different position relative to the corresponding cam whereby the respective circuits controlled thereby may be energized during different proportions of the cycle.

Figure 6:
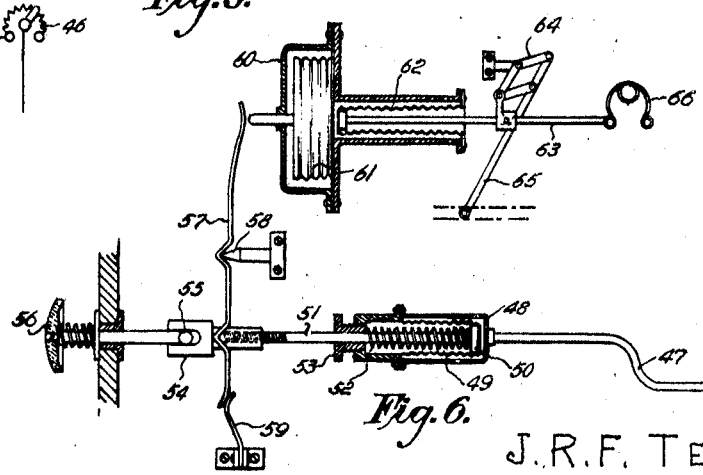
Figure 6 is a diagrammatic view showing the manner in which a controller may be operated by thermostatic means.

Figure 6 illustrates one means of thermostatically controlling the liberation of energy in the aforesaid output circuit.

In this mechanism a capillary tube 47 is connected at one end to a thermostat bulb (not shown) arranged adjacent to a heating or cooking element or elements embodied in the circuit to be regulated, and the other end of the tube 47 connects with a casing 48 within which is arranged a bellows 49 consisting of a flexible corrugated cylindrical member the free end of which is in contact with a plunger 50. This plunger is connected with a rod 51 which passes through the other end of the casing and a spring 52 extends between the plunger 50 and the inner end of a nut 53 which is operable to adjust the pressure exerted by the spring 52 on the bellows 49. The plunger rod 51 is threaded at its outer end and carries an adjusting head 54 having an axial slot carrying a pin 55 which is rotatable by a knob 56 conveniently arranged on the outside of the front panel of the device.

A lever 57 pivoted on a fulcrum 58 is tensioned at one end by a spring 59 and is engaged at one side of the fulcrum by the adjusting head 54 whilst its other end operates a hydraulic multiplier 60. The multiplier 60 is provided with large bellows 61 and small bellows 62 the whole being filled with a suitable fluid whereby the motion of the end of the lever 57 is multiplied, and the motion thus imparted to a rod 63 may be further multiplied by a pantograph system of levers 64. The motion is thus imparted to a lever 65 the end of which may be suitably connected to the carriage of a device such as that illustrated in Figures 1 to 4. A spring 66 tends to return the rod 63 to its initial position. It will thus be seen that expansion of the gas, vapor or other fluid in the thermostat bulb due to an increase in temperature of the heating elements will cause the lever 57 to pivot about the fulcrum 58 and this motion will be transmitted through the multiplier 60 and the lever system 64 to the carriage 21, the direction of movement of the carriage being such as to reduce the period during which the output circuit is energized for each cycle of the controller.

Should the temperature of the heating element fall, the mechanism operates in the reverse manner to effect an increased liberation of energy during each cycle. The operation of the device may be adjusted by the knob 56 and the nut 53.

Although the invention is concerned primarily with a method and apparatus whereby an electric circuit to be controlled is intermittently opened and closed, it will be obvious that, if desired, the circuit to be controlled may not be completely de-energized or interrupted. For example, if a resistance were connected between the terminals of the mercury switch embodied in the construction shown in Figures 1 to 4 of the drawings, it will be evident that this resistance would be short-circuited by the mercury switch when the latter was closed, whereas, when the mercury switch was opened, the resistance would permit a reduced current to pass through the circuit to be controlled. In these circumstances a cyclic fluctuating current would pass through the circuit to be controlled and the latter circuit would not be interrupted or completely de-energized by the control means. For this reason the term "de-energization" employed herein is intended to comprehend partial de-energization except where this wider meaning of the term is inconsistent with the context.

I claim:

1. In apparatus according to claim 2, a rotatable disc, a spiral slot on the disc, a projecting member on the carriage which fits within the said slot, and means for rotating the disc in order to move the carriage longitudinally of the cam.

2. Apparatus for controlling the current flowing in an electric circuit, comprising a tiltable mercury switch interposed in the circuit, a carriage on which the mercury switch is mounted, a hollow cylindrical cam cut away obliquely towards one end, means for rotating the cam, a follower connected to the mercury switch, one end of said follower being arranged to move over the surface of the cam as it rotates in order to alternately tilt the mercury switch to its closed and open positions, guides disposed parallel to the axis of the cam and on which the carriage is mounted to permit its being moved longitudinally of said cam, means for moving the carriage in either direction along the said guides whereby the ratio of the period of closure to the period of non-closure of the switch may be varied, and means for stopping rotation of the cam when the position of the switch relative to the cam is such that said switch is maintained either continuously closed or continuously open.

JOHN ROBERT FRANCIS TERRELL.